United States Patent Office 2,958,338
Patented Nov. 1, 1960

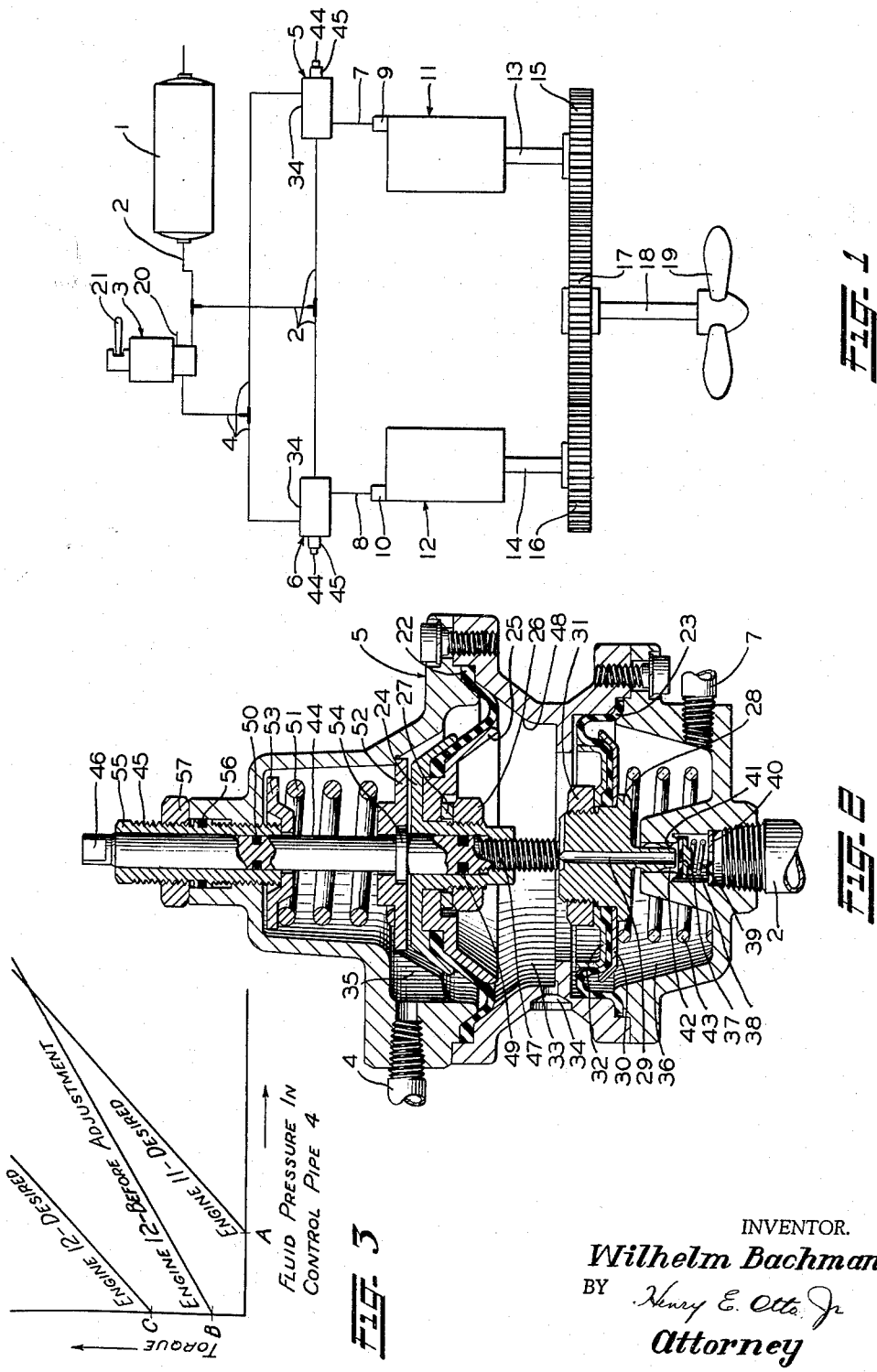

2,958,338

FUEL SUPPLY CONTROL ARRANGEMENT FOR MULTIPLE ENGINES DRIVING A COMMON SHAFT

Wilhelm Bachmann, Hannover, Germany, assignor to Westinghouse-Bremsen-Gesellschaft m.b.H., Hannover, Germany Filed Jan. 9, 1959, Ser. No. 785,912

Claims priority, application Germany Jan. 15, 1958

4 Claims. (Cl. 137—620)

This invention relates to fuel regulating valve devices for internal combustion engines, and more particularly relates to a fuel regulating valve device which is preadjustable so as to operatively control the richness of the fuel mixture supplied to a corresponding engine in a preselectable relationship according to increments of change of fluid pressure in a control pipe.

Where, as in the marine field, it is customary to arrange several diesel engines so that they may apply cumulative torques to a single propeller shaft, it is desirable to regulate the torque effectively delivered by each of the engines to the shaft by controlling the richness of the fuel mixture supplied to the respective engines. It is also desirable to control the fuel mixture supplied to the respective engines by controlling the pressure of fluid in a single control pipe, and having such pressure control operation of a respective fuel regulating valve device for each engine. Since the efficiency of each engine varies, the amount of fuel required by each engine to develop a desired torque will correspondingly vary even if the gear trains interconnecting each engine with the single shaft are identical; and hence it is desirable to be able to preadjust the fuel regulating valve device for each engine independently so that over the full operating range of control pipe pressure, each engine may be conditioned to deliver an equal share of the total torque applied to the shaft or, if preferred, one of said engines may be conditioned to serve as a standby engine and be cut in to deliver a minor part of the total torque only when control pipe pressure exceeds a selectable value indicative of a relatively high torque requirement.

It is therefore the principal object of this invention to provide an improved fuel regulating valve device which is relatively inexpensive to manufacture and which embodies means whereby the desired objectives above described may be accomplished.

To this end, and according to the invention, the improved fuel regulating valve device embodies valve means for controlling the pressure of fluid supplied to a fluid pressure-controlled mechanism, such as a fuel injection pump, that, in turn, controls the richness of the fuel mixture supplied to an engine; two movable abutments, such as diaphragm pistons, which are normally movable axially in unison as a stack, said stack being subject to control pipe pressure and pressure of a spring acting in opposition to pressure of another spring and of pressure at the pressure of fluid supplied to said mechanism; means for adjusting the ratio of the effective areas of both of said pistons and hence the increment of change in richness of the fuel mixture and hence in torque which will be effected for a given increment of change in control pipe pressure; and other means for adjusting the magnitude and direction of the net effective force of said springs, which net effective force, according to its direction, determines the value of control pipe pressure at which torque will commence to be delivered to the shaft or determines the torque which will be delivered to the shaft when control pipe pressure is zero.

Other objects and advantages will become apparent from the following more detailed description of the invention and from the accompanying drawing, wherein:

Fig. 1 is a diagrammatic view of a fuel supply control arrangement embodying the invention shown associated with two diesel engines arranged so as to apply cumulative torques to a single shaft for a marine propeller; Fig. 2 is an elevation view, primarily in section, of a fuel regulating valve, two of which are shown in outline in Fig. 1, one for each of said engines; and Fig. 3 shows illustrative desired torque vs. control pipe pressure calibration curves for each engine and an illustrated calibration curve of one of said engines before it is adjusted to its desired curve.

Description

As shown in Fig. 1, the fuel control arrangement embodying the invention comprises a supply reservoir 1 charged with pressure fluid from an air compressor (not shown), and a supply pipe 2 leading from said reservoir to an operator's control valve device 3 which controls the pressure of fluid provided in a control pipe 4. Branches of pipes 2 and 4 lead to respective fuel regulating valve devices 5, 6, which operate in the manner presently to be described to control the pressures of fluid provided in respective pipes 7, 8 that, in turn, control operation of fluid pressure controlled mechanisms, such as fuel injection pumps 9, 10, for diesel engines 11, 12, respectively. The drive shafts 13, 14 of the respective engines 11, 12 may be connected to spur gears 15, 16, respectively, both of which are rotated in the same direction so as to apply cumulative torques to a gear 17 that drives a shaft 18 of a marine propeller 19.

The operator's control valve device 3 may be of any well-known self-lapping type comprising valve means (not shown) operative to supply fluid under pressure from supply pipe 2 to control pipe 4 and release fluid under pressure from said control pipe via a vent pipe 20 as may be necessary to provide in pipe 4 fluid at a pressure corresponding to the arcuate position of an operating handle 21. This device 3 may be of the type disclosed in U.S. Patent No. 2,324,910, granted July 20, 1943, to E. S. Cook.

The fuel regulating valve devices 5, 6 are identical and of the self-lapping type, such as shown in Fig. 2, wherein the piping connections illustrated correspond to those for valve device 5. This valve device comprises two coaxially arranged and axially spaced annular, long-travel type diaphragm pistons 22, 23 clamped about their outer edges between sections of a sectionalized casing. Diaphragm piston 22 is clamped about its inner edge between parts of an annular diaphragm follower assemblage which may comprise an upper annular member 24 having a depending externally threaded boss that projects through the diaphragm piston and through a lower annular member 25, and a nut 26 screw-threaded onto the lower part of said boss and acting through a washer 27 on member 25 for clamping the inner portion of said diaphragm piston between said members. Diaphragm piston 23 is clamped about its inner edge between parts of a follower assemblage which may comprise a lower annular member 28 having an exhaust passageway 29 extending axially therethrough and a flange that overlies an annular spring seat plate 30 which engages the lower side of said annular diaphragm piston, and a nut 31 which is screw-threaded onto an externally threaded boss on member 28 that projects upwardly through plate 30 and an upper annular member 32 for clamping the inner portion of said diaphragm piston between plate 30 and member 32.

Between the diaphragm pistons 22, 23 is a chamber 33 open to atmosphere such as by way of a vent port 34. At the opposite (upper) side of piston 22 is a control chamber 35 open to control pipe 4, and at the opposite (lower) side of piston 23 is a delivery chamber 36 open to pipe 7.

Arranged coaxially with the pistons 22, 23 is a preferably disc-shaped supply valve 37 that is disposed in a chamber 38 open to a branch of supply pipe 2 and controls fluid pressure communication between chambers 36 and 38. A helical bias spring 39, that is disposed in chamber 38 and backed up by an annular retaining plate 40 suitably retained in the opening into which said branch of pipe 2 is screw-threaded, normally holds valve 37 seated against an annular valve seat rib encircling an aligned bore 41 open to chamber 36, for normally preventing communication between chambers 36 and 38. Member 28 has a depending stem portion terminating in an exhaust valve 42, that encircles exhaust passageway 29 and projects into bore 41 and is adapted to sealingly abut and then unseat valve 37 against the bias of spring 39.

A helical spring 43 disposed in chamber 36 bears against plate 30 for biasing the piston 23 and its follower assemblage in the direction of piston 22 to a normal position defined by abutting contact of the upper end of the depending boss of member 28 with the lower end of a coaxially-arranged spindle 44 that extends upwardly through member 24 and chamber 35 and through a coaxially-arranged annular adjusting screw 45 and terminates exteriorly of the casing in a wrench-engageable portion 46.

The spindle 44 comprises adjacent its lower end, an externally-threaded portion 47 which has self-locking screw-threaded engagement within a threaded bore provided in the depending boss of member 24. Hence, by application of a turning force to wrench-engageable portion 46, the normal position of the non-rotatable diaphragm piston 22 and its follower assemblage can be moved axially relative to spindle 44 and piston 23 for thus varying the area of the unclamped part of said diaphragm piston normally in contact with a downwardly and inwardly sloped cone-like surface 48 that in part defines the side wall of chamber 35, so as thereby correspondingly to vary the normal mean effective area of said diaphragm piston.

Spindle 44 also comprises, between its end portions 46 and 47, a cylindrical portion which carries an O-ring seal 49 having sealing contact with member 24 to prevent leakage of pressure fluid from control chamber 35 into atmospheric chamber 33 and also carries another O-ring seal 50 having sealing contact with adjusting screw 45 to prevent leakage of pressure fluid from chamber 35 to atmosphere along said screw.

A helical regulating spring 51 is disposed in chamber 35 and bears against two annular spring seat plates 52, 53 that encircle spindle 44. Expansion of spring 51 in the direction of piston 22 is limited by abutting engagement of lower plate 52 with a retaining collar 54 formed integrally with the spindle 44 adjacent the upper end of member 24; and expansion of spring 51 in the opposite direction is limited by abutting contact of upper plate 53 with the lower end of adjusting screw 45.

Screw 45, which as above stated encircles spindle 44, is disposed in an aligned opening through the end wall of chamber 35 and terminates exteriorly of the casing in a wrench-engageable portion 55. Adjacent its lower end, screw 45 has an externally-threaded portion which has screw-threaded engagement within a threaded part of the last-mentioned opening so that the axial position of the plate 53 may be adjusted by application of a turning force to portion 55; and above said threaded portion is a cylindrical portion which carries an O-ring seal 56 having sealing contact with an unthreaded part of said opening to prevent leakage along said opening; and above said cylindrical portion is another externally-threaded portion onto which a lock nut 57 is screwed for locking the screw 45 in a desired position after adjustment.

From the foregoing, it will be apparent that spring 43 will always bias the piston 23 into operative contact with the lower end of spindle 44; that said spindle, and hence the piston 22 screw-thread-connected thereto, will be biased, by spring 51 acting through plate 52 and collar 54, toward piston 23; that by rotation of spindle 44, the normal axial position of the clamped and thus non-rotatable piston 22 relative to said spindle and piston 23 can be varied so as to vary the area of the unclamped part of diaphragm piston 22 which is normally in contact with sloping surface 48 and thereby vary the mean effective area of the piston 22; that the adjusting screw 45 may be rotated independently of the spindle 44 inwardly and outwardly of the casing for correspondingly, through plate 53, increasing and decreasing the bias force of spring 51; that with control chamber 35 vented, exhaust valve 42 will be unseated from supply valve 37, as shown, so as to maintain chamber 36 and hence pipe 7 vented, only if the adjusted bias force of spring 51 is less than the bias force of spring 43; and that due to the self-locking screw-threaded connection of portion 47 of spindle 44 with the member 24, the spindle will be moved axially by and with the piston 22 during axial deflection of the latter, and the pistons 22, 23 are thus operatively connected so as to constitute a piston stack 22, 23, 44.

Operation

Assume initially that reservoir 1 is charged; that handle 21 of the control valve device 3 is in a release position for completely venting control pipe 4; and that, in device 5, the bias force of spring 43 exceeds the adjusted bias force of spring 51. Under this condition, the piston stack 22, 23, 44 of regulating valve device 5 will be in a release position in which it is shown in Fig. 2; and the torque developed by engine 11 will be zero, as indicated at point A in Fig. 3.

Assume now that handle 21 is moved arcuately to provide in control pipe 4 and hence in chamber 35 of device 5 fluid at a pressure which, when assisted by spring 51, is sufficient to cause piston 22 and hence spindle 44 to be moved downwardly and thereby, through said spindle, shift piston 23 downward a corresponding extent against resistance of spring 43, for shifting the piston stack 22, 23, 44 to a supply position. During this movement to supply position, exhaust valve 42 will be successively seated against supply valve 37 for cutting off chamber 36 from atmospheric chamber 33 and then, through such seating contact, unseat said supply valve against resistance of spring 39 for supplying reservoir pressure fluid from supply pipe 2 to chamber 36. Pressure in chamber 36 and hence in pipe 7 will increase until the upward force exerted on the piston stack 22, 23, 44 by the combined pressures of springs 43 and 39 and of fluid in chamber 36 acting over the effective area of piston 23 slightly exceeds the opposing force exerted on said stack by the combined pressures of spring 51 and of fluid in chamber 35 acting over the effective area of piston 22; whereupon said stack will be shifted upwardly a slight degree to a lap position, in which supply valve 37 is seated by spring 39 but exhaust valve 42 remains seated against said supply valve, for thereby bottling up fluid in chamber 36 and pipe 7 at a pressure corresponding to the existing value of control pipe pressure.

Meanwhile, as pipe 7 is charged with fluid at said corresponding pressure, the fuel injection pump 9 will be actuated to increase the richness of the fuel mixture supplied to engine 11 and thereby cause the latter effectively to apply a corresponding torque to the propeller 19.

If handle 21 is moved to provide fluid at a reduced pressure in control pipe 4 and hence in control chamber 35 of valve device, the consequent reduction in the downward force exerted on the piston stack 22, 23, 44 will cause spring 43 and fluid pressure acting on piston 23 to move said stack upward to release position, in which it is shown, for unseating exhaust valve 42 and reducing pressure in chamber 36 and pipe 7 to a degree corresponding to the reduced value of control pipe pressure; whereupon said stack will return to its lap position for again bottling up fluid in pipe 7 at a correspondingly reduced pressure. Meanwhile, the consequent reduction in pressure in pipe 7 will cause the fuel rack 9 to be actuated to reduce the fuel supply to the engine 11 and hence the torque exerted thereby.

So that the torques cumulatively delivered by the engines 11 and 12 to the common propeller shaft 18 may be controlled in a straight-line relationship according to variations in pressure of fluid in the common control pipe 4, it is apparent that the fuel regulating valve devices 5 and 6 for these engines should be adjusted so that the slopes of the respective torque vs. control pipe pressure calibration curves for each engine (see Fig. 3) will be parallel. If, for example, the engine 12 is intended to be the main power source and engine 11 is to be an auxiliary power source cut in only at relatively high loads, the calibration curves for these engines may be adjusted so as to correspond to the curves labelled "Engine 12-desired" and "Engine 11-desired" in Fig. 3.

Assume for sake of simplification that the existing calibration curve for engine 11 already corresponds to the "desired" curve and therefore requires no adjustment; and that the existing calibration curve for engine 12 is as labelled "Engine 12-before adjustment," in Fig. 3, and thus not only is not parallel to the "Engine 11" curve but does not provide a desired minimum torque on the propeller shaft 18 when control pressure is zero.

To adjust the calibration curve for engine 12 from its "before adjustment" to its "desired" curve, the fuel regulating valve device 6 for engine 12 is adjusted in the following manner. Referring to Fig. 2, adjusting screw 45 is screwed inwardly of the casing to lower the plate 53 and thus increase the adjusted bias force of spring 51 to a greater degree in excess of the opposing bias force of spring 43 and thus elevate the "zero control pressure point" of the engine 12 curve from B to C (see Fig. 3). Since the slope of the "before adjustment" curve for engine 12 is not steep enough, spindle 25 of device 6 is rotated so as to move the clamped and hence non-rotatable diaphragm piston 22 axially upward relative to said spindle and, by thus "peeling" the unclamped part of said diaphragm piston away from contact with surface 48, increase the mean effective area of said diaphragm piston. Consequently, for each increment of change in control pressure in pipe 4 and hence in chamber 35 thereafter effected, an increased increment of change in fluid pressure in chamber 36 and pipe 8 and hence in torque will now be obtained. Thus, the curve for engine 12 may be adjusted to correspond to the "desired" curve by calibration of the fuel regulating valve device 6 in the manner just described.

With respect to engine 11, it will be noted that the position of point A on the "Engine 11-desired" curve indicates that the bias force of spring 43 of device 5 substantially exceeds the adjusted bias force of the corresponding spring 51. Hence, a relatively high control pipe pressure will be required in order to effect supply of pressure fluid to pipe 7 and thus cause an increase in the fuel supply to engine 11 for causing the latter to effectively deliver torque to propeller shaft 18. This indicates that device 5 has been adjusted so as to condition engine 11 to serve as a standby engine which is effectively cut in to apply additional torque to shaft 18 only when control pipe pressure exceeds a value corresponding to a relatively high torque requirement.

If it is desired to have both engines 11 and 12 supply one-half of the total torque to the shaft 18, it will be understood that the fuel regulating valve devices 5 and 6 may be adjusted, in the manner above described, so that the individual calibration curves for each engine will be identical and thus cause a total torque to be imparted to the shaft 18 which is double that indicated by the curve for one engine.

It will thus be apparent that by adjustment of the valve devices 5 and 6, the engines 11 and 12 may be conditioned so as to have identical or parallel calibration curves, or even non-parallel curves if such should be desired; it being noted that by so rotating adjusting screw 45 of a particular one of these valve devices as to raise plate 53 and thus reduce the adjusted bias force of spring 51, the calibration curve of the corresponding will be engineshifted rightward as viewed in Fig. 3, and that by so rotating the associated spindle 44 as to move diaphragm piston 22 axially downward and roll more of the unclamped part of said diaphragm piston onto surface 48, the effective area of said diaphragm piston will be reduced and hence the steepness of the slope of the calibration curve of the corresponding engine will be reduced.

It will be understood that the fuel supply control arrangement herein disclosed may be employed where more than two engines are to be used to deliver cumulative torques to a common shaft. In such event, a fuel regulating valve device, such as 5, will be associated with each engine and controlled by pressure of fluid in the common control pipe 4 and adjusted in the manner above described so that each engine will apply torque to the common shaft concurrently or in stages control pipe pressure is increased.

It will also be understood that while the control pipe pressure is illustrated as being manually controlled, this fuel supply control arrangement may be employed where the control pipe pressure is automatically controlled.

Having now described the invention, what I claim as new and desire to secure by Letters Patent, is:

1. A fuel regulating valve device for operatively controlling in a preselectable relationship, according to variations in a control fluid pressure, the richness of the fuel mixture supplied by a fluid pressure-controlled mechanism to an internal combustion engine and hence the torque delivered by the latter, said valve device comprising a casing means, two cooperatively connected piston means normally reciprocable axially in unison in the casing means as a stack, valve means controlled by said stack for operatively controlling the pressure of fluid provided in the mechanism, a spring, another spring, said stack being subject to the control fluid pressure and pressure of the first-mentioned spring acting in opposition to the pressure of said other spring and the pressure of fluid provided in the mechanism for actuating said valve means to provide in the mechanism fluid at a pressure corresponding to the control fluid pressure as modified according to the ratio of the effective areas of the respective piston means and the net effective force of said springs, manually adjustable means for adjusting said net effective force so that said first-mentioned spring or said other spring may exert a preponderant bias on said stack, at least one of said piston means being of the diaphragm-piston type non-rotatably clamped about its outer edge between the casing means and having an unclamped part which normally contacts a portion of a coaxially arranged sloping cone-like surface of the casing means, and other means having screw-threaded connection with said one piston means and manually rotatable for so shifting the normal axial position of said non-rotatable one piston means relative to that of the other of said piston means as to vary the area of said unclamped part which is normally in contact with said sloping surface and thereby vary the effective area of said one piston means relative to that of said other piston means and hence said ratio, whereby torque will automatically be varied in accordance with changes in the control fluid pressure along a curve the "zero control fluid pressure" point of which will be dependent upon the magnitude and direction of said net effective force as preadjusted, and the slope of which will be dependent upon said ratio as preadjusted.

2. A fuel regulating valve device for controlling in a preselectable relationship, according to variations in a control fluid pressure, the pressure of fluid provided in a fluid pressure-controlled mechanism that controls the richness of the fuel mixture supplied to an internal combustion engine and hence the power delivered by the latter, said valve device comprising casing means, a pair of coaxially arranged diaphragm piston means non-rotatably clamped about their outer edges between sections of said casing means and having therebetween an atmospheric chamber with a side wall including a coaxially arranged sloping surface, spindle means arranged coaxially with and having operative screw-threaded engagement with one of said diaphragm piston means and abuttingly engaging the other of said diaphragm piston means whereby said pair of diaphragm piston means are cooperatively connected so as normally to move axially in unison as a stack, valve means controlled by said stack for controlling supply of fluid under pressure to and release of fluid under pressure from and bottling up of fluid under pressure in the mechanism, a spring, another spring, said stack being subject to the control fluid pressure and pressure of the first-mentioned spring acting in opposition to the pressure of fluid in the mechanism and pressure of said other spring for so actuating said valve means as to provide in the mechanism fluid at a pressure corresponding to the control fluid pressure as modified according to the ratio of the effective areas of the respective diaphragm piston means and the net effective force of said springs, said spindle means being rotatable for adjusting the normal axial position of said non-rotatable one diaphragm piston means and hence the unclamped area of the latter normally in contact with said sloping surface so as thereby correspondingly to adjust the effective area of said one diaphragm piston means and hence said ratio, and adjusting means for adjusting the effective force of one of said springs for correspondingly adjusting said net effective force, whereby the control fluid pressure at which power will commence to be delivered by the engine will depend upon said net effective force as preadjusted, and whereby the rate of change of such power according to increments of change in control fluid pressure will depend upon said ratio as preadjusted.

3. A fuel regulating valve device for operatively controlling in a preselectable relationship, according to variations in pressure of fluid in a control pipe, the richness of the fuel mixture supplied by a fluid pressure-controlled mechanism to an internal combustion engine and hence the torque delivered by the latter, said valve device comprising a casing means providing a control chamber connectable to the control pipe, an atmospheric chamber having a side wall including a sloping cone-like surface, and a delivery chamber connectable to the mechanism; a pair of coaxially-arranged diaphragm piston means non-rotatably clamped at their outer edges between sections of, and reciprocable relative to, said casing means and disposed at opposite sides of and in part defining the end walls of said atmospheric chamber; spindle means arranged coaxially with, and having operative screw-threaded engagement with, one of said diaphragm piston means and abuttingly engaging the other of said diaphragm piston means whereby said pair of diaphragm piston means are co-operatively connected so as normally to move axially in unison as a stack; valve means controlled by said stack for controlling supply of fluid under pressure to and release of fluid under pressure from and bottling up of fluid under pressure in said delivery chamber; a spring; another spring; said stack being subject to control chamber pressure and pressure of the first-mentioned spring acting in opposition to delivery chamber pressure and pressure of said other spring for so actuating said valve means as to provide in said delivery chamber fluid at a pressure corresponding to control chamber pressure as modified according to the ratio of the effective areas of the respective diaphragm piston means and the net effective force of said springs; said spindle means being rotatable for adjusting the normal axial position of said non-rotatable one diaphragm piston means and hence the unclamped area of the latter normally in contact with said sloping surface so as thereby correspondingly to adjust the effective area of said one diaphragm piston means and hence said ratio; and adjusting means for adjusting the effective force of one of said springs for correspondingly adjusting said net effective force, whereby the control chamber pressure at which torque will commence to be supplied by the engine will depend upon said net effective force as preadjusted, and whereby the rate of change of such torque according to increments of change in control chamber pressure will depend upon said ratio as preadjusted.

4. A valve device for operatively controlling in a preselectable relationship, according to variations in a control fluid pressure, the pressure of fluid supplied to a fluid pressure-controlled mechanism, said valve device comprising casing means, valve means controlling pressure of fluid in the mechanism, a plurality of cooperatively connected piston means normally reciprocable in the casing means as a stack, said stack being subject opposingly to the control fluid pressure and to the pressure in the mechanism and operative to actuate said valve means to cause the latter to provide in the mechanism fluid at a pressure which is proportional to the control fluid pressure and varies according to the ratio of the effective areas of the respective piston means, at least one of said piston means being of the diaphragm-piston type non-rotatably clamped about its outer edge between the casing means and having an unclamped part which normally contacts a portion of a coaxially arranged sloping cone-like surface of the casing means, and other means operably connected to said one piston means for shifting the normal axial position of said non-rotatable one piston means relative to that of the other of said piston means to vary the area of said unclamped part which is normally in contact with said sloping surface and thereby vary the effective area of said one piston means relative to that of said other piston means and hence said ratio, whereby pressure in the mechanism will automatically be varied in accordance with changes in the control fluid pressure along a curve the slope of which will be dependent upon said ratio as preadjusted.

References Cited in the file of this patent

UNITED STATES PATENTS

| | | |
|---|---|---|
| 2,230,914 | Sherman | Feb. 4, 1941 |
| 2,284,687 | Schimanek | June 2, 1942 |
| 2,365,384 | Bonnier | Dec. 19, 1944 |
| 2,399,301 | Spence | Apr. 30, 1946 |
| 2,464,636 | Eaton | Mar. 15, 1949 |
| 2,692,156 | Canetta et al. | Oct. 19, 1954 |